July 29, 1924.
C. J. CONNORS
AUTO LOCK
Filed Dec. 26, 1919
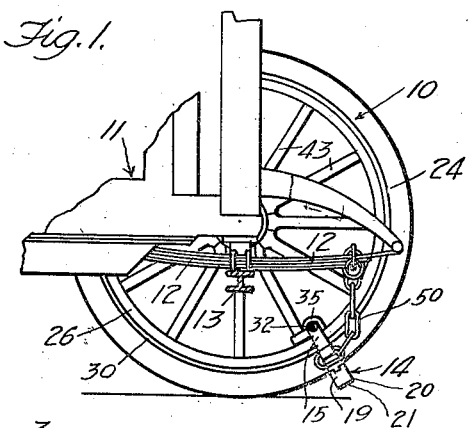
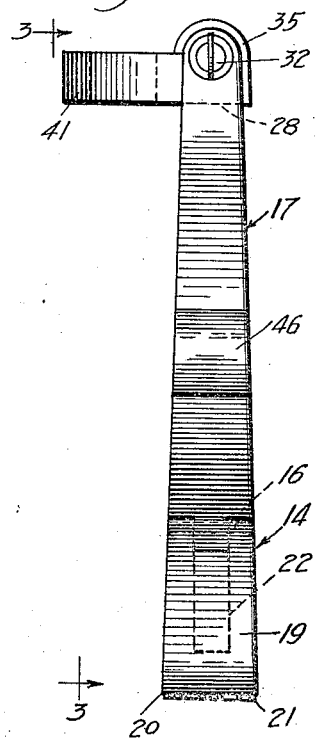
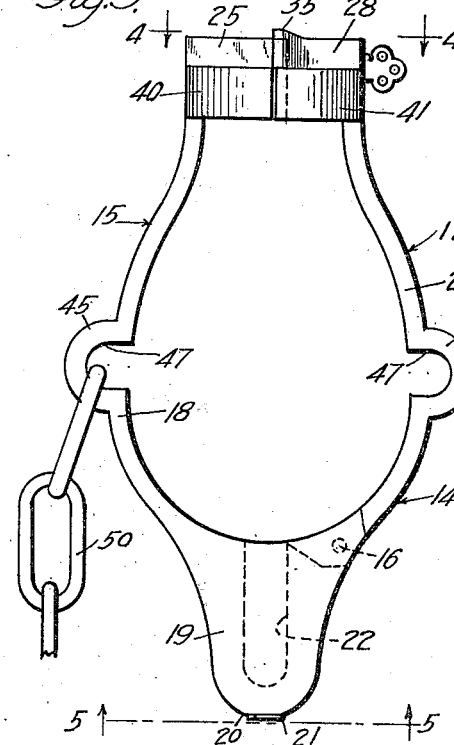
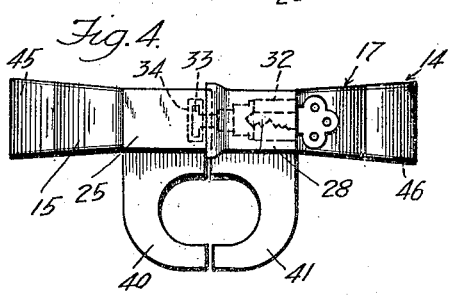
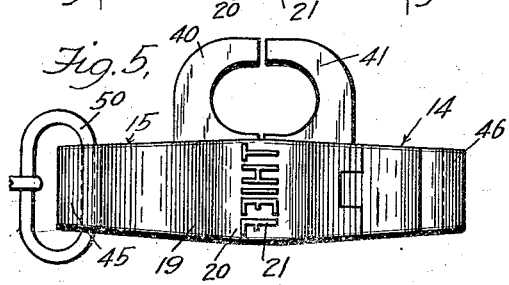
Inventor:
Cornelius J. Connors,
by
his Attorney
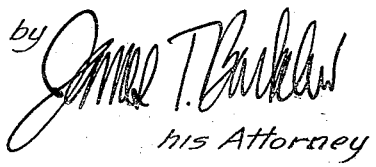

Patented July 29, 1924.

1,502,809

UNITED STATES PATENT OFFICE.

CORNELIUS J. CONNORS, OF LOS ANGELES, CALIFORNIA.

AUTO LOCK.

Application filed December 26, 1919. Serial No. 347,512.

*To all whom it may concern:*

Be it known that I, CORNELIUS J. CONNORS, a citizen of the United States, residing at Los Angeles, in the county of Los Angeles, State of California, have invented new and useful Improvements in Auto Locks, of which the following is a specification.

This invention relates to a device to be applied to an automobile wheel in order to prevent unauthorized movement of the automobile and specifically to a device to be attached to an automobile in order to cause violent jarring of the machine if it is moved while the device is in place. It is an object of the invention to provide a simple, effective and inexpensive device of this character.

A particular feature of the invention is the provision of a wheel chock or lock which will cause violent jarring of the entire machine if it is moved while the lock is in place and which can not be shifted or moved to a position where it will not cause such jarring. With the device provided by the invention it is impossible for a thief or unauthorized person to deflate the tire, turn the lock to a position where there is no projection to cause jarring, and then inflate the tire thereby making it possible to move the machine without any appreciable jarring. This feature of the invention is of particular importance due to the fact that in practice devices of this general character which are at present in common use can be manipulated as above set forth to render them useless.

A further and important feature of the invention is the provision of means whereby the lock can not be rotated or even moved longitudinally relative to the rim of the wheel. By providing such means in a device of this character it is impossible for an unauthorized person to move the lock even though such movement would not make it possible to put the device in a position where it would not be effective. This feature of the invention when combined with the feature above set forth makes the lock doubly secure and particularly effective.

There are further objects and features of the invention which will be best understood from the following detailed description of a preferred embodiment of the invention throughout which reference is had to the accompanying drawings in which—

Fig. 1 is a view of a portion of an automobile showing one of the front wheels thereof, and showing the lock provided by the present invention in connection with the wheel; Fig. 2 is a side elevation of the lock provided by the invention, showing it removed from the wheel; Fig. 3 is a view taken as indicated by line 3—3 on Fig. 2; Fig. 4 is a view taken as indicated by line 4—4 on Fig. 3; and Fig. 5 is a view taken as indicated by line 5—5 on Fig. 3.

Throughout the drawings numeral 10 designates the wheel of the automobile which is connected to the main portion 11 thereof by a suitable spring 12 and axle 13. The particular wheel shown in the drawings is one of the front wheels of the machine and the construction shown in connection with the wheel is merely shown as typical construction common to the front or forward portion of an automobile. The lock 14 provided by the invention is shown in connection with the wheel 10 and although its manner of arrangement in connection with a rear of an automobile is not specifically illustrated, it will be readily understood that the lock may be applied with equal effect either to a front or a rear wheel of an automobile or like vehicles.

The lock 14 comprises a body 15 to which is hinged or pivotally connected at 16 an arm 17. As is clearly shown in the drawings, the body 15 of the lock comprises a curved side wall 18 from the lower end of which extends a ground engaging projection 19. The ground engaging projection 19 preferably extends considerable distance from or beyond the lower end of the side wall 18 and has formed in its outer face or end 20 suitable letters 21. Any suitable or desired letters or markings may be formed in the face 20, of the ground engaging projection 19, although it is preferred that the letters be such as to spell the word thief thereby causing that word to be marked or left in the pavement over which the machine may be moved by an unauthorized person. In the preferred form of construction the ground engaging projection 19 is cored out at 22 in order to reduce the weight of the lock and also to reduce its cost of manufacture. When the lock is placed on the wheel 10 the side wall 18 of the body engages one side of the tire 24 while the ground engaging projection 19 extends considerable distance beyond the periphery of the tire as clearly shown in Fig. 1. At the inner or upper end of the side wall 18, of the body 15, there is an inwardly extending block 25 which is adapted to engage the inner face of the wheel felly 26.

The arm 17, which is hinged to the body 15 at 16, has a curved portion 27, similar and opposite to the side wall 18 of the body 15, and also has at its upper or inner end inwardly extending block 28 which is adapted to engage the block 25 in the manner shown in the drawings. The blocks 25 and 28 are preferably shaped substantially as shown in the drawings so that if the device is turned through 180° or approximately 180° from the position shown in the drawings they will act as ground engaging members to cause violent jarring of the machine if it is moved. It will be readily understood how the device may be put in place around the felly 26, rim 30 and the tire 24 by swinging the arm 17 outwardly, and how it may be positively locked in place around said members by subsequently swinging the arm 17 inwardly and locking the blocks 25 and 28 together or in the position shown in the drawings. Any suitable means may be provided for locking the blocks 25 and 28 together. For instance, a suitable lock mechanism 32 may be carried in one of the blocks and provided with a T-bolt 33 which is adapted to connect or lock the two blocks together by extending into a suitable socket 34 in the opposite block. In order to cover the connection between the block 25 and the block 28 and thereby make it impossible to cut the T-bolt 33 a suitable flange 35 is provided on one of the blocks so as to extend somewhat over the end of the other, as clearly shown in the drawings. It will be understood that the particular manner of locking the blocks 25 and 28 together is merely a typical manner in which it may be done and that the invention is not in any way limited to the specific arrangement shown in the drawings.

In order that the lock 14 may be arranged on the wheel 10 so that it can not be moved longitudinally relative to the felly 26, and so that it can not be rotated relative to the felly 26, the rim 30 and the tire 24, jaws 40 and 41 extend from the blocks 25 and 28, respectively, so that when the two blocks are in engagement with each other the jaws form a loop as clearly shown in the drawings. It will be readily understood how the lock may be placed on the wheel so that when it is in its locked position one of the spokes 43 of the wheel is held in the loop formed by the jaws. The jaws are oppositely disposed curved members preferably formed integral with their respective blocks. It will be readily understood how the jaws 40 and 41 when arranged in connection with a spoke 43 positively prevent disarrangement of the lock 14 and positively moves into engagement with the ground every time the wheel 10 is rotated.

Similar and opposite projections 45 and 46 extend from the side wall 18 of the body 15 and the curved portion 27 of the arm 17 respectively, as clearly shown in the drawings. The projections 46 and 47 provide ground engaging members, in the event that the jaws 40 and 41 are not provided on the lock, or if provided, are not arranged in connection with a spoke, so that the lock can not be turned or moved to a position where there will not be an extended portion or projection to engage the ground and thereby cause jarring of the machine. It will be readily understood that if the lock 14 is turned through 90° in either direction from the position shown in Fig. 1 that one of the projections 45 or 46 will be in position to engage the ground if the wheel is rotated. If the lock is not rotated a full 90° but is rotated any fraction thereof or in fact if it is rotated any amount in any direction it can not be brought to a position where there will not be an extended portion or projection of some character which will engage the ground if the wheel is rotated.

In the preferred form of the invention notches or recesses 47 are provided at the projections 45 and 46 which recesses are adapted to receive a chain 50. The chain 50 may be used if it is desired to further and more positively lock the automobile by connecting the lock 14 to a suitable part of the machine such as the spring 12 thereof, as clearly shown in Fig. 1.

Having described a preferred embodiment of my invention I do not wish to limit myself to the specific details hereinabove set forth but wish to reserve to myself any changes or modifications that may appear to those skilled in the art or fall within the scope of the following claims.

Having described a preferred form of my invention, I claim:

1. An automobile lock of the character described, embodying a body and an arm hingedly secured together and adapted to encircle a tire and felly, means for locking the body and arm in their encircling relation, the body having a ground engaging projection at one end, and the body and arm having a trough-like projection at the side extending outwardly at the side of the encircled tire with the trough facing the tire; the projection forming a ground engaging part to engage the ground if the whole device is rotated around the tire and felly and the trough being adapted for reception of a locking chain or the like.

2. An automobile lock of the character described, embodying a body and an arm hingedly secured together and adapted to encircle a tire and felly, means for locking the body and arm in their encircling relation, the body having a ground engaging projection at one end, and the body and arm having a trough-like projection at the side extending outwardly at the side of the encircled tire with the trough facing the tire; the projection forming a ground engaging part to engage the ground if the whole device is rotated around the tire and felly; a locking chain having a link passing around the body and through the trough, and means for attaching the chain to a stationary part of the automobile.

3. An automobile lock of the character described embodying a body and an arm hingedly secured together and adapted to encircle a tire and felly, means for locking the body and arm in their encircling relation, a ground engaging projection at the outer end of the body and projections on the sides of the body and arm to engage the ground if the device is rotated on the tire and felly, the last mentioned projections having openings in them to receive a chain or the like.

In witness that I claim the foregoing I have hereunto subscribed my name this 12th day of December, 1919.

CORNELIUS J. CONNORS.

Witness:
VIRGINIA BERINGER.